United States Patent
Williams et al.

(10) Patent No.: US 9,294,624 B2
(45) Date of Patent: Mar. 22, 2016

(54) SYSTEM AND METHOD FOR CLIENT INTERACTION APPLICATION INTEGRATION

(71) Applicant: Virtual Hold Technology, LLC, Akron, OH (US)

(72) Inventors: Mark J. Williams, North Canton, OH (US); Jeremy Starcher, Canal Fulton, OH (US); Robert F. Brazier, Jr., Akron, OH (US)

(73) Assignee: VIRTUAL HOLD TECHNOLOGY, LLC, Akron, OH (US)

( * ) Notice: Subject to any disclaimer, the term of this patent is extended or adjusted under 35 U.S.C. 154(b) by 252 days.

(21) Appl. No.: 13/842,237

(22) Filed: Mar. 15, 2013

(65) Prior Publication Data

US 2013/0301820 A1 Nov. 14, 2013

Related U.S. Application Data

(63) Continuation-in-part of application No. 13/659,902, filed on Oct. 24, 2012, now Pat. No. 8,938,221, which is a continuation-in-part of application No. 13/446,758, filed on Apr. 13, 2012, now Pat. No.
(Continued)

(51) Int. Cl.
*H04M 3/42* (2006.01)
*H04M 3/51* (2006.01)
(Continued)

(52) U.S. Cl.
CPC ............ *H04M 3/5191* (2013.01); *G06Q 10/02* (2013.01); *H04M 3/42195* (2013.01); *H04M 3/5231* (2013.01); *H04M 3/5238* (2013.01)

(58) Field of Classification Search
USPC ......... 709/203, 206–207, 217–219, 235, 250; 379/201, 265
See application file for complete search history.

(56) References Cited

U.S. PATENT DOCUMENTS 5,309,505 A * 5/1994 Szlam et al. ............... 379/88.01
6,738,473 B1 * 5/2004 Burg ..................... H04M 3/428
379/266.01
(Continued)

FOREIGN PATENT DOCUMENTS

| WO | WO 9701917 A1 | * | 1/1997 | |
| WO | WO 0005867 | * | 2/2000 | ............ H04M 3/48 |
| WO | WO 0005867 A1 | * | 2/2000 | |

*Primary Examiner* — Saket K Daftuar
(74) *Attorney, Agent, or Firm* — Galvin Patent Law LLC; Brian R. Galvin

(57) ABSTRACT

A system for client interaction application integration, comprising a plurality of enterprise communications systems, each comprising at least a call status system; and a callback cloud accessible coupled to the plurality of enterprise communications systems via a data network; wherein, upon receipt of a request from a consumer user to initiate a callback to the consumer user, the callback cloud performs the steps of: (a) obtaining from at least one of the enterprise communications systems a status of communications resources comprising at least an estimated wait time; (b) sending a notification to the consumer user from whom the request was received advising the consumer user of the estimated wait time for service; (c) providing at least an option to wait for a callback to the consumer user from whom the request was received; (d) receiving a selection from the consumer user from whom the request was received; and (e) directing at least one of the enterprise communications systems to initiate a callback to the consumer user from whom the request was received in response to the selection received from the consumer user; and
further wherein at least one of the enterprise communications systems initiates a callback to a consumer user at the direction of the callback cloud.

1 Claim, 10 Drawing Sheets

Related U.S. Application Data 8,792,866, which is a continuation-in-part of application No. 12/320,517, filed on Jan. 28, 2009, now Pat. No. 8,213,911, said application No. 13/659,902 is a continuation-in-part of application No. 13/479,870, filed on May 24, 2012, which is a continuation-in-part of application No. 12/320,517.

(51) Int. Cl.
*G06Q 10/02* (2012.01)
*H04M 3/523* (2006.01)

(56) References Cited

U.S. PATENT DOCUMENTS

| | | | |
|---|---|---|---|
| 7,023,979 B1* | 4/2006 | Wu et al. | 379/265.11 |
| 7,372,952 B1* | 5/2008 | Wu et al. | 379/220.01 |
| 8,300,798 B1* | 10/2012 | Wu et al. | 379/265.11 |
| 2004/0179668 A1* | 9/2004 | Gilbert et al. | 379/210.01 |
| 2005/0201547 A1* | 9/2005 | Burg | H04M 3/523 379/266.01 |
| 2007/0036327 A1* | 2/2007 | Button | H04M 3/4285 379/265.01 |
| 2007/0274495 A1* | 11/2007 | Youd et al. | 379/210.01 |
| 2008/0152116 A1* | 6/2008 | Sylvain | H04M 3/4285 379/216.01 |
| 2010/0189250 A1* | 7/2010 | Williams | H04M 3/5233 379/266.01 |
| 2010/0190477 A1* | 7/2010 | Williams | G06Q 10/02 455/414.1 |
| 2012/0295596 A1* | 11/2012 | Camulli | G06Q 10/02 455/414.1 |
| 2014/0113548 A1* | 4/2014 | Camulli | H04M 3/5238 455/41.1 |

* cited by examiner

SYSTEM AND METHOD FOR CLIENT INTERACTION APPLICATION INTEGRATION

CROSS-REFERENCE TO RELATED APPLICATIONS

This application is a continuation-in-part of U.S. patent application Ser. No. 13/659,902, which was filed on Oct. 24, 2012 and titled "SYSTEM AND METHOD FOR PROVIDING A CALLBACK CLOUD," which is a continuation-in-part of U.S. patent application Ser. No. 13/446,758, which was filed on Apr. 13, 2012 and titled "A MOBILE COMMUNICATION DEVICE FOR ESTABLISHING AUTOMATED CALL BACK," which is a continuation-in-part of U.S. patent application Ser. No. 12/320,517, now issued as U.S. Pat. No. 8,213,911, which was filed on Jan. 28, 2009 and titled "A MOBILE COMMUNICATION DEVICE FOR ESTABLISHING AUTOMATED CALL BACK," the specifications of each of which are hereby incorporated by reference in their entirety. This application is also a continuation-in-part of U.S. patent application Ser. No. 13/479,870, which was filed on May 24, 2012 and titled "MANAGING, DIRECTING, AND QUEUING COMMUNICATION EVENTS USING IMAGE TECHNOLOGY", which is also a continuation-in-part of U.S. patent application Ser. No. 12/320,517, now issued as U.S. Pat. No. 8,213,911, the specifications of both of which are hereby incorporated by reference in their entirety.

BACKGROUND OF THE INVENTION

1. Field of the Invention

The invention relates to the field of software applications, and more particularly to the field of integrating human interaction software with corporate communication systems.

2. Discussion of the State of the Art

Almost every new smartphone and some personal computers come equipped (or are capable of being equipped) with a type of live interaction software application that can accept and process voice commands, such as to perform basic tasks like "search the internet for X", "get me directions to X", "call X", or other uses. Such software may also provide a speech-to-text capability that allows a user to type through voice commands and send a written message. Such live interaction applications provide many benefits to users, and since they perform functions in a hands-free mode they can save time and even provide safety to the user—such as when performing computing tasks simultaneously with daily activities such as walking or operating a vehicle.

While live interaction applications are useful, and provide a "personal" touch to the interaction between user and device, they do have limitations in functionality and their overall usefulness can be considered "incomplete" in supporting the overall tasks being performed by a user. For example, utilizing existing technologies in the art, a user may perform a phone number search for a business through a live interaction application and be presented with the search result they desired. The user can now instruct the live interaction application to "dial" the number, and at this point the value and utility of the live interaction application is complete.

In this example, the user wanted to communicate with a business and the live interaction application dialed the number for the user. The user may now have to listen to an interactive voice response (IVR) system for the company, which could prompt them to manually type or speak responses to questions that will help guide the user to an appropriate resource within the company that can assist their needs. The live interaction application was useful in its task of searching for the contact number and initiating the call, but the user was still left to input info and interact with an automated system to get to the resource they desired (which may or may not even be available).

What is needed, is a means to integrate resource access and communications through a client facing live interaction application and enable the live interaction application to access company resource information and availability of those resources, communicate that information back to the user, and provide the user with options to connect and communicate with that resource through the live interaction application, thereby providing a complete end-to-end value for using the live interaction application in support of the users request to establish communication with a resource or contact.

SUMMARY OF THE INVENTION

Accordingly, the inventor has conceived and reduced to practice, in a preferred embodiment of the invention, a system and methods for seamless integration of existing client-facing technologies with corporate communication systems.

According to a preferred embodiment of the invention, a system for client interaction application integration, comprising a plurality of enterprise communications systems, each comprising at least a call status system; and a callback cloud accessible coupled to the plurality of enterprise communications systems via a data network; wherein, upon receipt of a request from a consumer user to initiate a callback to the consumer user, the callback cloud performs the steps of: (a) obtaining from at least one of the enterprise communications systems a status of communications resources comprising at least an estimated wait time; (b) sending a notification to the consumer user from whom the request was received advising the consumer user of the estimated wait time for service; (c) providing at least an option to wait for a callback to the consumer user from whom the request was received; (d) receiving a selection from the consumer user from whom the request was received; and (e) directing at least one of the enterprise communications systems to initiate a callback to the consumer user from whom the request was received in response to the selection received from the consumer user; and

BRIEF DESCRIPTION OF THE DRAWING FIGURES

The accompanying drawings illustrate several embodiments of the invention and, together with the description, serve to explain the principles of the invention according to the embodiments. One skilled in the art will recognize that the particular embodiments illustrated in the drawings are merely exemplary, and are not intended to limit the scope of the present invention.

DETAILED DESCRIPTION

Figure 1:
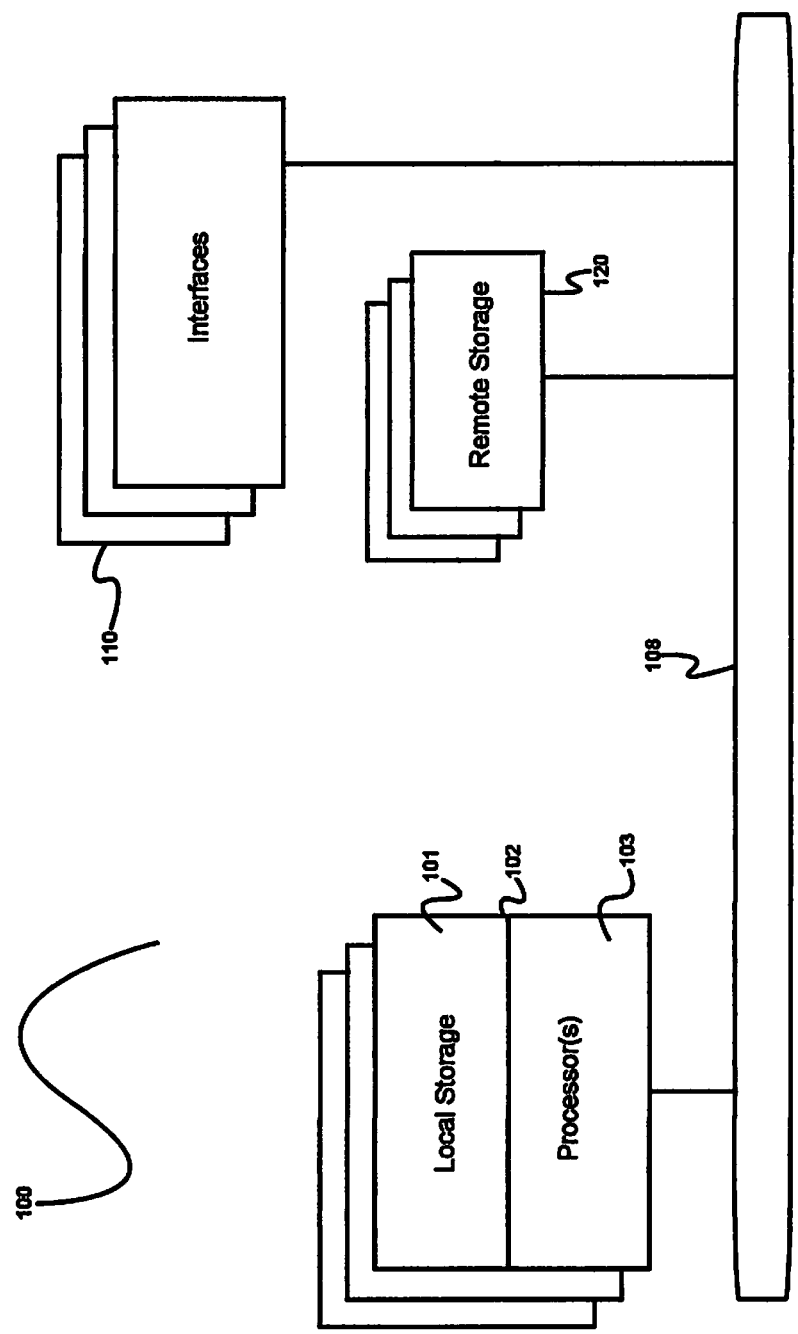
FIG. 1 is a block diagram illustrating an exemplary hardware architecture of a computing device used in an embodiment of the invention.

The inventor has conceived, and reduced to practice, a system and methods for seamless integration of existing client-facing technologies with corporate communication systems.

One or more different inventions may be described in the present application. Further, for one or more of the inventions described herein, numerous alternative embodiments may be described; it should be understood that these are presented for illustrative purposes only. The described embodiments are not intended to be limiting in any sense. One or more of the inventions may be widely applicable to numerous embodiments, as is readily apparent from the disclosure. In general, embodiments are described in sufficient detail to enable those skilled in the art to practice one or more of the inventions, and it is to be understood that other embodiments may be utilized and that structural, logical, software, electrical and other changes may be made without departing from the scope of the particular inventions. Accordingly, those skilled in the art will recognize that one or more of the inventions may be practiced with various modifications and alterations. Particular features of one or more of the inventions may be described with reference to one or more particular embodiments or figures that form a part of the present disclosure, and in which are shown, by way of illustration, specific embodiments of one or more of the inventions. It should be understood, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries, logical or physical.

A description of an embodiment with several components in communication with each other does not imply that all such components are required. To the contrary, a variety of optional components may be described to illustrate a wide variety of possible embodiments of one or more of the inventions and in order to more fully illustrate one or more aspects of the inventions. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described, it will be readily apparent that more than one device or article may be used in place of a single device or article. Similarly, where more than one device or article is described, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be noted that particular embodiments include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

DEFINITIONS

A "resource", as used herein, may refer to any hardware or software product, system or service that may be operated by a corporate entity and which may be interacted with in some capacity by human users for various purposes. Exemplary resources might include company web servers running web services or a company website, databases or other storage systems, application servers operating software for client or internal use, routing systems for managing communications either internally or with customers or other external individuals, a physical device such as a document printer for printing hard copies of electronic documents, or any other hardware or software system that might be utilized by a business or enterprise.

A "client technology", as used herein, may refer to any hardware or software product or service that may be utilized by an individual for various purposes including (but not limited to) interaction with various corporate resources. Such technologies might include mobile applications operating on a mobile device such as a smartphone or tablet computing device (or any suitable mobile electronic device), web browsers operating on a laptop or desktop personal computing device (or any suitable computing device such as might be capable of operating software applications and communicating via a data network such as the Internet), virtual personal assistant software operating on an appropriate electronic or computing device, document viewing or printing service that might operate on a user's device or be accessible via a communications network and operate remotely as a cloud-based service, or any other software or hardware product or service that could be used by an individual to interact with external products or services such as corporate resources.

An "integrated resource", as used herein, may refer to any resource as defined above that has been designed or adapted to be directly compatible with existing client technologies for various purposes, such that client technologies need not be altered or adapted to interact with such resources as might otherwise be required for interaction with non-integrated resources such as, to use a very simple example, attempting to print a document from a smartphone using an installed document viewer application (the "client technology"), using an office printer that may not be compatible with such software (the "resource"). Integration might enable a universal software driver interface for such a printer, or provide a software layer that operates between a document viewer and document printer endpoints, translating information to facilitate interaction without modification to the client technology (the printer is now an "integrated resource" and may be used with existing client technologies without alterations being required to such technologies).

As used herein a "callback cloud" is a cloud-based system for conducting callback operations on request by business or consumer users, as described in co-pending patent application Ser. No. 13/659,902, from which this application depends.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be disclosed herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, and the like), a consumer electronic device, a music player, or any other suitable electronic device, router, switch, or the like, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or the like).

Referring now to FIG. 1, there is shown a block diagram depicting an exemplary computing device 100 suitable for implementing at least a portion of the features or functionalities disclosed herein. Computing device 100 may be, for example, any one of the computing machines listed in the previous paragraph, or indeed any other electronic device capable of executing software- or hardware-based instructions according to one or more programs stored in memory. Computing device 100 may be adapted to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 100 includes one or more central processing units (CPU) 102, one or more interfaces 110, and one or more busses 106 (such as a peripheral component interconnect (PCI) bus). When acting under the control of appropriate software or firmware, CPU 102 may be responsible for implementing specific functions associated with the functions of a specifically configured computing device or machine. For example, in at least one embodiment, a computing device 100 may be configured or designed to function as a server system utilizing CPU 102, local memory 101 and/or remote memory 120, and interface(s) 110. In at least one embodiment, CPU 102 may be caused to perform one or more of the different types of functions and/or operations under the control of software modules or components, which for example, may include an operating system and any appropriate applications software, drivers, and the like.

CPU 102 may include one or more processors 103 such as, for example, a processor from one of the Intel, ARM, Qualcomm, and AMD families of microprocessors. In some embodiments, processors 103 may include specially designed hardware such as application-specific integrated circuits (ASICs), electrically erasable programmable read-only memories (EEPROMs), field-programmable gate arrays (FPGAs), and so forth, for controlling operations of computing device 100. In a specific embodiment, a local memory 101 (such as non-volatile random access memory (RAM) and/or read-only memory (ROM), including for example one or more levels of cached memory) may also form part of CPU 102. However, there are many different ways in which memory may be coupled to system 100. Memory 101 may be used for a variety of purposes such as, for example, caching and/or storing data, programming instructions, and the like.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 110 are provided as network interface cards (NICs). Generally, NICs control the sending and receiving of data packets over a computer network; other types of interfaces 110 may for example support other peripherals used with computing device 100. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, Firewire™, PCI, parallel, radio frequency (RF), Bluetooth™ near-field communications (e.g., using near-field magnetics), 802.11 (WiFi), frame relay, TCP/IP, ISDN, fast Ethernet interfaces, Gigabit Ethernet interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 110 may include ports appropriate for communication with appropriate media. In some cases, they may also include an independent processor and, in some instances, volatile and/or non-volatile memory (e.g., RAM).

Although the system shown in FIG. 1 illustrates one specific architecture for a computing device 100 for implementing one or more of the inventions described herein, it is by no means the only device architecture on which at least a portion of the features and techniques described herein may be implemented. For example, architectures having one or any number of processors 103 may be used, and such processors 103 may be present in a single device or distributed among any number of devices. In one embodiment, a single processor 103 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 120 and local memory 101) configured to store data, program instructions for the general-purpose network operations, or other information relating to the functionality of the embodiments described herein (or any combinations of the above). Program instructions may control execution of or comprise an operating system and/or one or more applications, for example. Memory 120 or memories 101, 120 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory, solid state drives, memristor memory, random access memory (RAM), and the like. Examples of program instructions include both object code, such as may be produced by a compiler, machine code, such as may be produced by an assembler or a linker, byte code, such as may be generated by for example a Java™ compiler and may be executed using a Java virtual machine or equivalent, or files containing higher level code that may be executed by the computer using an interpreter (for example, scripts written in Python, Perl, Ruby, Groovy, or any other scripting language).

Figure 2:
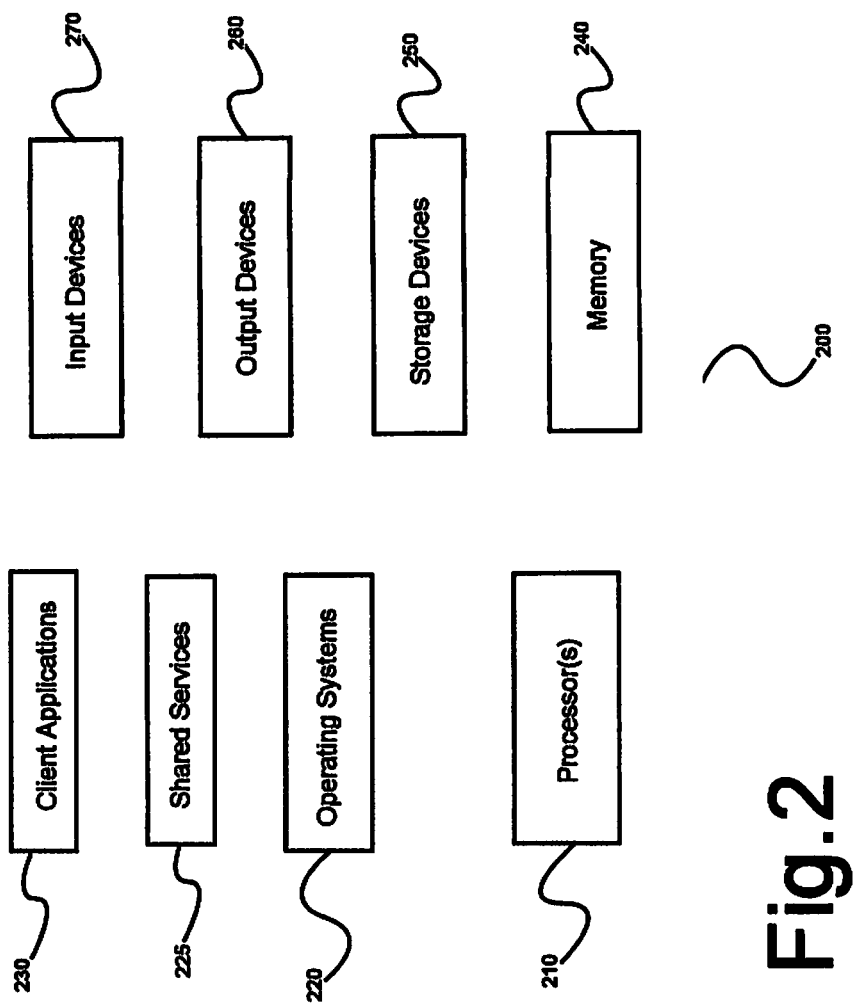
FIG. 2 is a block diagram illustrating an exemplary logical architecture for a client device, according to an embodiment of the invention.

In some embodiments, systems according to the present invention may be implemented on a standalone computing system. Referring now to FIG. 2, there is shown a block diagram depicting a typical exemplary architecture of one or more embodiments or components thereof on a standalone computing system. Computing device 200 includes processors 210 that may run software that carry out one or more functions or applications of embodiments of the invention, such as for example a client application 230. Processors 210 may carry out computing instructions under control of an operating system 220 such as, for example, a version of Microsoft's Windows™ operating system, Apple's Mac OS/X or iOS operating systems, some variety of the Linux operating system, Google's Android™ operating system, or the like. In many cases, one or more shared services 225 may be operable in system 200, and may be useful for providing common services to client applications 230. Services 225 may for example be Windows™ services, user-space common services in a Linux environment, or any other type of common service architecture used with operating system 210. Input devices 270 may be of any type suitable for receiving user input, including for example a keyboard, touchscreen, microphone (for example, for voice input), mouse, touchpad, trackball, or any combination thereof. Output devices 260 may be of any type suitable for providing output to one or more users, whether remote or local to system 200, and may include for example one or more screens for visual output, speakers, printers, or any combination thereof. Memory 240 may be random-access memory having any structure and architecture known in the art, for use by processors 210, for example to run software. Storage devices 250 may be any magnetic, optical, mechanical, memristor, or electrical storage device for storage of data in digital form. Examples of storage devices 250 include flash memory, magnetic hard drive, CD-ROM, and/or the like.

Figure 3:
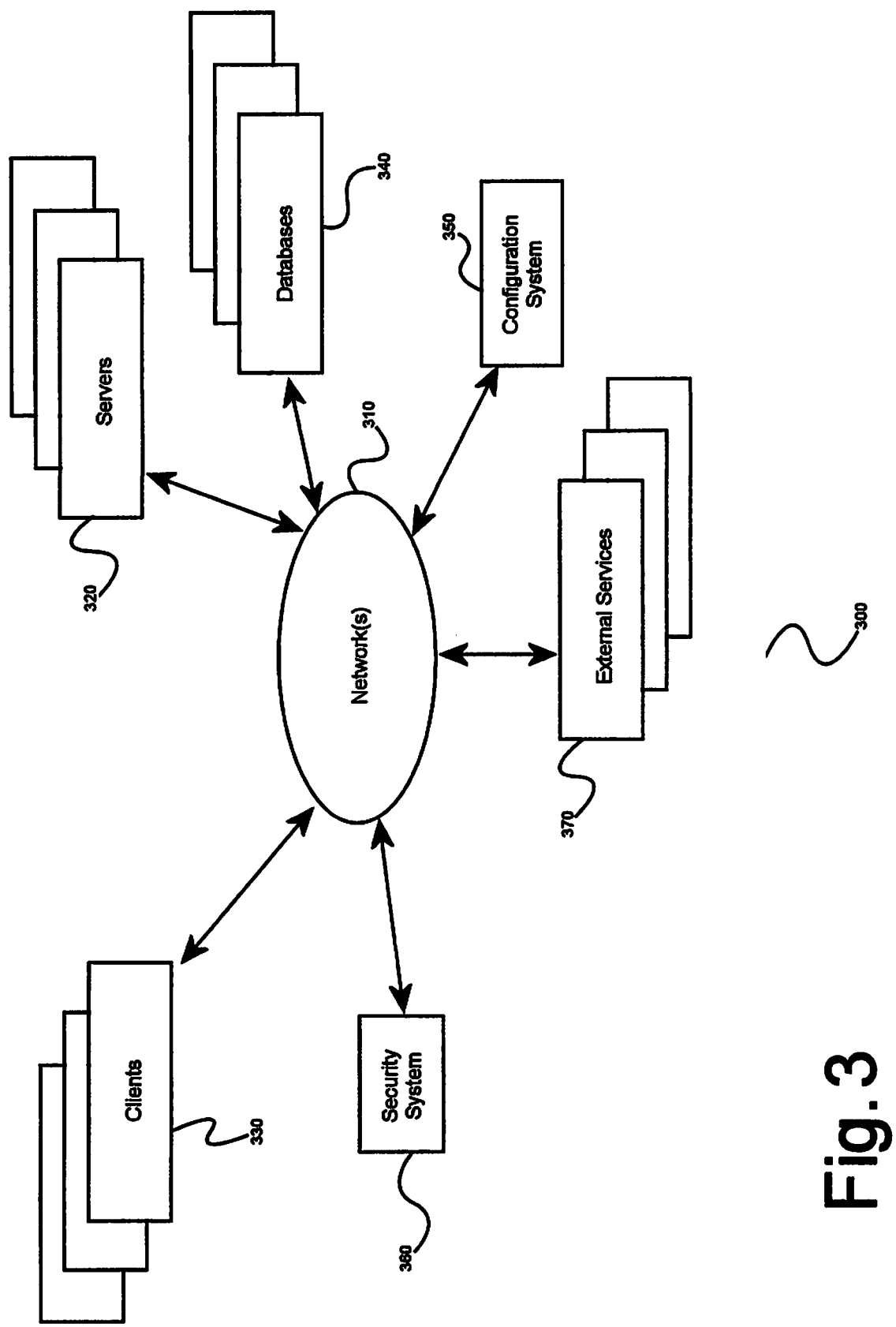
FIG. 3 is a block diagram showing an exemplary architectural arrangement of clients, servers, and external services, according to an embodiment of the invention.

In some embodiments, systems of the present invention may be implemented on a distributed computing network, such as one having any number of clients and/or servers. Referring now to FIG. 3, there is shown a block diagram depicting an exemplary architecture for implementing at least a portion of a system according to an embodiment of the invention on a distributed computing network. According to the embodiment, any number of clients 330 may be provided. Each client 330 may run software for implementing client-side portions of the present invention; clients may comprise a system 200 such as that illustrated in FIG. 2. In addition, any number of servers 320 may be provided for handling requests received from one or more clients 330. Clients 330 and servers 320 may communicate with one another via one or more electronic networks 310, which may be in various embodiments any of the Internet, a wide area network, a mobile telephony network, a wireless network (such as WiFi, Wimax, and so forth), or a local area network (or indeed any network topology known in the art; the invention does not prefer any one network topology over any other). Networks 310 may be implemented using any known network protocols, including for example wired and/or wireless protocols.

In addition, in some embodiments, servers 320 may call external services 370 when needed to obtain additional information, or to refer to additional data concerning a particular call. Communications with external services 370 may take place, for example, via one or more networks 310. In various embodiments, external services 370 may comprise web-enabled services or functionality related to or installed on the hardware device itself. For example, in an embodiment where client applications 230 are implemented on a smartphone or other electronic device, client applications 230 may obtain information stored in a server system 320 in the cloud or on an external service 370 deployed on one or more of a particular enterprise's or user's premises.

In some embodiments of the invention, clients 330 or servers 320 (or both) may make use of one or more specialized services or appliances that may be deployed locally or remotely across one or more networks 310. For example, one or more databases 340 may be used or referred to by one or more embodiments of the invention. It should be understood by one having ordinary skill in the art that databases 340 may be arranged in a wide variety of architectures and using a wide variety of data access and manipulation means. For example, in various embodiments one or more databases 340 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 360 and configuration systems 350. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 360 or configuration system 350 or approach is specifically required by the description of any specific embodiment.

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

Conceptual Architecture

Figure 4:
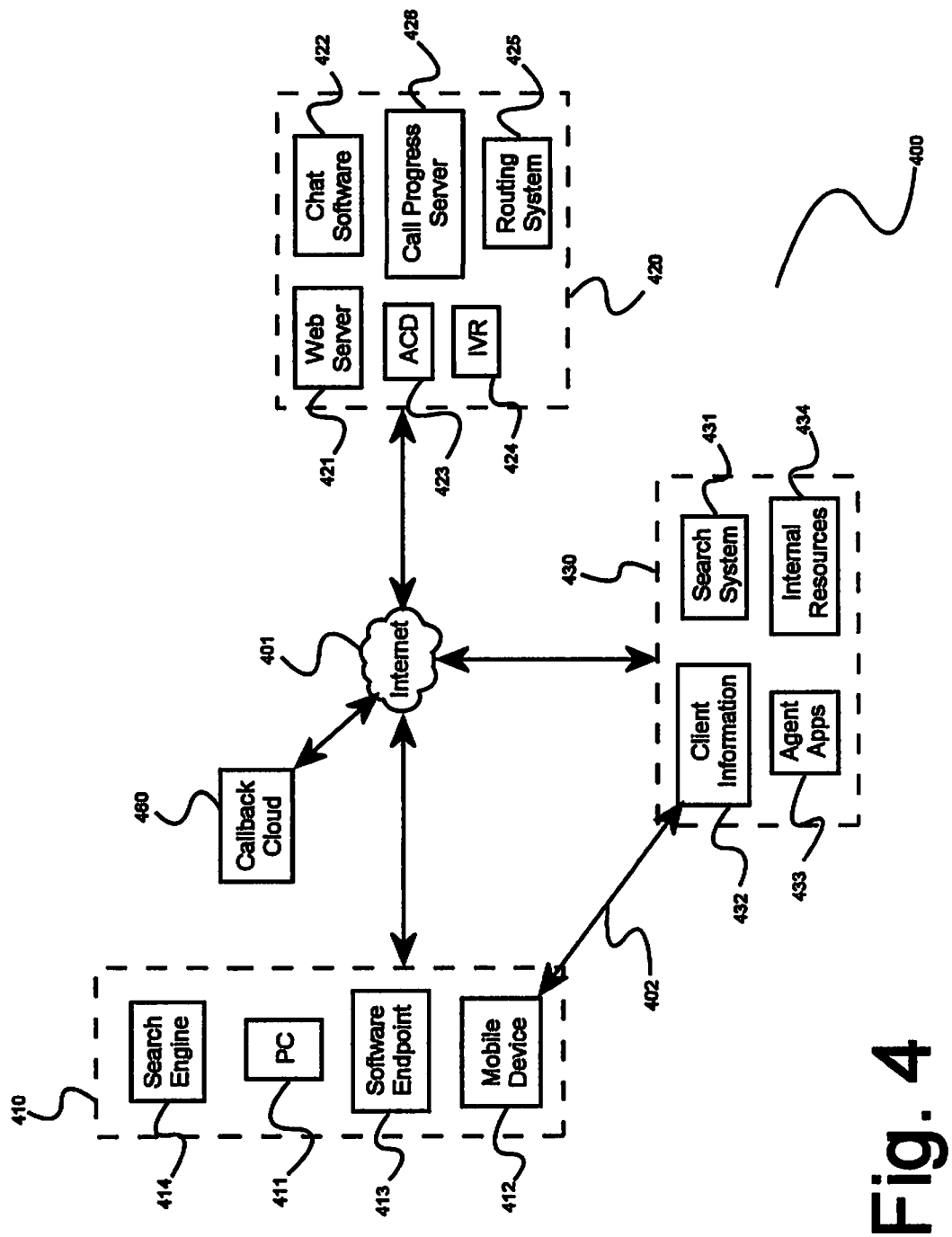
FIG. 4 is a block diagram of an exemplary system architecture according to a preferred embodiment of the invention.

FIG. 4 is an illustration of an exemplary system architecture 400, according to a preferred embodiment of the invention. As illustrated, a variety of client-facing technologies 410 may be utilized, such as (as illustrated) a personal computing device 411 that may run a web browser or web-enabled software applications, such as might be used to search for or interact with corporate products or services (for example, browsing a company's product catalog electronically), mobile device 412 such as a smartphone or tablet computing device (and it should be appreciated that such devices are exemplary and any suitable mobile computing device may be utilized according to the invention) that may run a web browser or dedicated mobile application for interaction with a company's services as is common in the art (many corporations develop in-house software to increase exposure and quality of service and it is well established that such applications can greatly improve customer experience), a software application 413 that may be a live assistant technology such as Siri™ or similar personal assistant software product or service, or a search engine 414 such as may be utilized by a variety of electronic devices (such as including, but not limited to, laptop or desktop personal computers, smartphones, tablet computing devices, or other suitable electronic devices) for submissions of queries such as searching for information regarding products or services or looking for contact information for a corporation (or any other information or service that a user or customer may desire to access but not have immediately available). It should be appreciated that such technologies as illustrated are exemplary, and a wide variety of such technologies may be utilized according to the invention and that such technologies are highly fluid and constantly evolving within the art. As such, alternate, additional, or improved technologies may become available and any software or hardware technology that facilitates client interaction may be utilized according to the invention.

System 400 may further comprise a variety of corporate resources or services 420 that users may desire to access or interact with either directly (such as viewing a company's product catalog) or indirectly (such as utilizing an IVR system while contacting a service representative in a contact center). Such resources may include, but are not limited to, a web server 421 that may operate and present web-enabled software or services (such as providing a web site to a web browser operating on a personal computer 411), chat application software 422 such as might be utilized in a web site page for contacting a representative from within a web browser or web-enabled software without necessitating the use of other contact methods such as a phone call, an automatic call distributor (ACD) 423 such as is common in the art and which may process routing and direction of incoming phone calls for a contact center (such as may be desirable to ensure a customer reaches an agent or department best suited for their particular interests or query), an interactive voice response (IVR) system 424 such as is common in the art and that may operate an interactive voice-based menu system for inbound calls to a contact center (as may be desirable to allow a customer to input personal information, clarify their needs or reason for calling, or select a department relevant to their interests prior to reaching a representative), various routing elements 425 such as may be utilized by a corporate office or contact center for directing queries to appropriate internal resources (such as directing queries regarding personnel information to a human resources representative, or queries regarding products to a sales representative), or a call progress detection server 426 such as may be suitable for monitoring a phone call placed by a contact center to a customer, wherein an agent may not yet be involved (such as, for example, dialing a customer's number then waiting for a response before connecting to an agent such as to optimize use of agent call time). It should be appreciated that such resources and services are exemplary, and a wide variety of services and technologies are common or available in the art and may be utilized according to the invention.

As further illustrated, system 400 may further comprise a variety of technologies 430 that may be utilized according to the methods of the invention (which are described in detail below, referring to FIGS. 7-9) to facilitate integration between client-facing technologies 410 and corporate resources 420. Such technologies may include (but are not limited to) search applications 431 as may be appropriate for querying corporate resources for information to be presented to client applications, client information applications 432 as may be appropriate for querying client-side applications to retrieve relevant information (such as, for example, a customer's location or other personal information) for use in accessing relevant corporate resources (for example, a customer in the USA may not wish to view product availability or find business locations in Germany), agent applications 433 such as may be appropriate for retrieving corporate information that might otherwise only be available internally to agents or for retrieving agent information such as availability or skill sets, or internal resources 434 such as workforce management or human resources systems (or any other internal resource that may be useful to clients and may safely be presented to external viewing, i.e. not proprietary or internal use only), as may be utilized for retrieval of company information such as operating hours, staffing, locations, or other potentially relevant corporate information that might be available from a specific department's systems. It should be appreciated that such technologies are exemplary, and a wide variety might be utilized according to the invention, and it should be further appreciated that the nature of the invention may be readily adapted to alternate or additional technologies as may become available.

In the manner illustrated, a plurality of client-side technologies 410 may be integrated via a plurality of means 430 with a plurality of corporate resources 420. Such integration may be accomplished in a variety of ways, such as (as illustrated) communicating via the Internet 401 or another communication network, or via a direct connection 402 between various systems or technologies, such as (for example, as illustrated) a client information application 432 that may be operating on a client mobile device 412, such as a mobile application that may be given direct access to information on device 411 such as contacts, personal information, location, or other information. In this manner, it will be appreciated that a client may directly access information or services provided by such resources, without necessitating a variety of "middle steps" such as navigating an IVR or speaking with a representative to retrieve basic information that could be easily presented to a client application. Such processes may be handled by systems 430 utilized in integration such that end user experience may be more consistent, relevant, and convenient.

In general, callbacks and other proactive communications initiated by system 400 in accordance with the present invention may be accomplished using a callback cloud 460 such as that described by co-pending U.S. patent application Ser. No. 13/659,902, to which the present application claims priority. It will be appreciated by one having ordinary skill in the art, however, that any callback technology known in the art may be used to conduct consumer-initiated callback operations as described herein, according to the invention.

DETAILED DESCRIPTION OF EXEMPLARY
EMBODIMENTS

Figure 5:
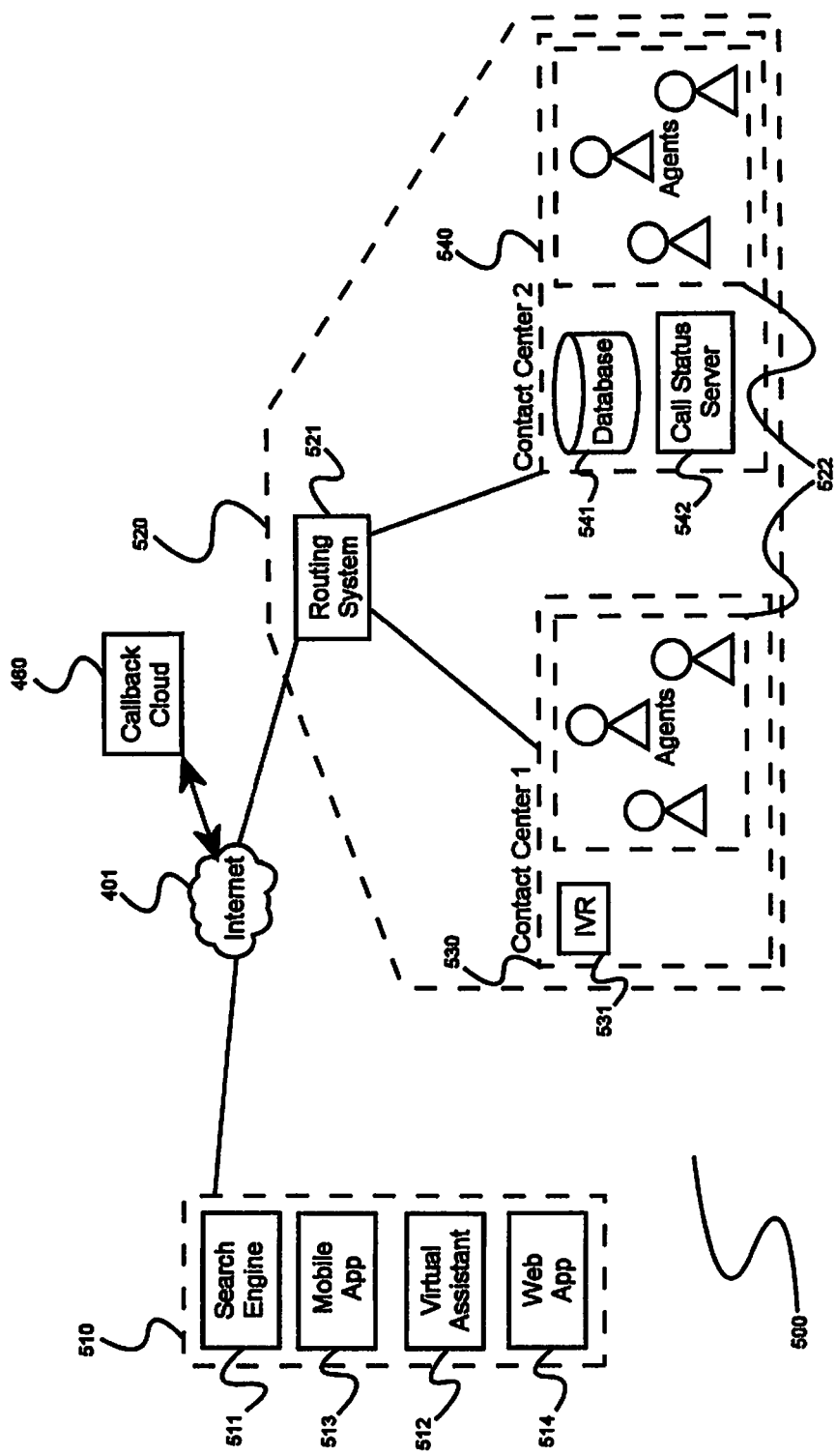
FIG. 5 is a block diagram of an exemplary system architecture, showing the system of the invention in greater detail, according to a preferred embodiment of the invention.

FIG. 5 is an illustration of an exemplary system architecture 500, illustrating a more detailed architecture according to an embodiment of the invention. As illustrated and in a manner described previously (referring to the system 400 illustrated in FIG. 4), a plurality of client technologies 510 may be connected to and in communication with a plurality of corporate resources 520, such as via the Internet 401 or another communication network. As illustrated, corporate resources 520 may be distributed across a plurality of contact centers 530, 540 or other corporate or business establishment, and such resources may be of similar or different function (as illustrated).

As illustrated, client technologies may include a variety of software or hardware technologies with a variety of similar or distinct functions and uses, such as a search engine 511 such as Google™ or Bing™ (or any other software system designed to receive or process information search queries), a virtual assistant 512 such as Siri™ or other interactive personal assistant software, a mobile application 513 such as might be configured and operating on a mobile device such as a smartphone, tablet computing device or any other suitable device, ideally a portable electronic device capable of storing and operating software applications and communication via the Internet 401 or another communications network such as a cellular data network which may be of varied architecture and operation, or a software endpoint 514 such as a chat communications client (such as Yahoo Instant Messenger™, Skype™, or other chat communications software), web-enabled interface such as a webpage element adapted for display of relevant information (such as a detail sidebar on a webpage displaying product information), or other software technology that might be adapted for use in viewing, interaction with, or otherwise accessing corporate resources such as those described below. It should be appreciated that the technologies illustrated and described are exemplary, and additional or alternate technologies or specific instances of such technology (such as virtual assistants other than Siri™) may be utilized according to the invention, and it should be further appreciated that new technologies may be realized and become available in the art and may be utilized according to the invention. In this manner it can be seen that the system of the invention may be readily adapted to a variety of specific implementations or architectures, and may be scalable and flexible with regard to additional elements or new technologies, or any other alterations which may be possible according to the invention.

As illustrated, a contact center 530, 540 may comprise a variety of resources that may be relevant to a customer and that may be safely made accessible to a user (i.e., not proprietary information or internal-use-only systems that a corporation would not wish end users to be able to access). Such resources might include for example, a routing system 521 that might handle routing of incoming communications to appropriate destination endpoints and which may be operated outside of a particular contact center such as to facilitate routing of communications across a plurality of contact centers (as illustrated), IVR 531 that might be used to identify a customer's information or needs, a product database 541 that might store information regarding a corporation's products or services (i.e., an electronic catalog system), or a plurality of contact center agents 522 such as might be available for responding to customer communications directly when an automated system may be insufficient or otherwise undesirable (such as, for example, if a customer has a specific question that is not answered by automated prompts).

A routing system 521 might be utilized for the purpose of receiving customer communications such as might include (but are not limited to) telephone calls, e-mails, short message service (SMS) or other mobile text communications, web-based chat interactions, or any of a number of additional or alternate communication means as might be utilized. Routing system 521 may receive such communications, analyze any available information (Such as a phone number or e-mail address a communication was sent from), and determine how to appropriately route a communication to an appropriate endpoint (such as sending a telephone call to an agent 522, as is common in a traditional contact center paradigm). It may be desirable for a client technology to directly access routing system 521 for such purposes as, for example, a customer calling regarding a product or service via contact functionality integrated as a component of a company's mobile application 513, which may be enabled to integrate with a device upon which it operates, accessing a user's information such as personal information (name, location, language preference, contact numbers or addresses, or any other potentially-relevant information), information about the device itself (such as may be useful when a customer calls for assistance with a smartphone or other electronic device), or any other information about a user's interests or preferences that may be useful or relevant to an interaction, and which may be further enabled to integrate directly with a company's routing system 521 such as to directly view or process routing logic such as to utilize gathered information to determine an appropriate endpoint for communication without requiring input from a user or requiring them to wait while routing takes place—as envisioned by the inventor, a user might initiate communication via a mobile app 513 (such communication may be of varied means such as a phone call, e-mail or text message, or other communication technology that may be integrated into or accessible from within a mobile software application), then continue using other features or performing activities while mobile app 513 routes and connects a user's communication request. Mobile app 513 may then notify a user that an endpoint has been reached. In this manner, a user's experience may be improved by allowing potentially tedious or inconvenient processes such as routing to occur more quickly or efficiently, or by allowing a user the flexibility to pursue other activity while waiting for such processes to complete.

An alternate use of integration with a routing service 521 might be a user who seeks to contact a corporation, but does not know a particular department or location to contact. By interacting with a search engine 511, a user may be able to enter information regarding a desired interaction (such as topic, relevant details, or optionally a specified time for an interaction to take place) or search for specific keywords or topics relevant to the nature of their desired interaction, and search engine 511 may then access routing system 521 as part of a search operation to retrieve routing information and determine a plurality of appropriate potential endpoints based on user's input (such as determining how a company's routing logic handles requests similar to a user's input information to determine a relevant endpoint or set of endpoints). Search engine 511 may then present potential endpoints to a user as search results, allowing a user to conveniently choose whether to initiate contact as well as who or where to contact. It should be appreciated that in this manner, integration may be accomplished with existing search engines 511 such as Google™ or Bing™, which may display integrated technologies alongside standard search results or may optionally incorporate dedicated or specialized functionality for searching integrated technologies—for example, a user might enter a search query and be presented with options for performing a traditional search (such as of web pages and other web-accessible information as is common in the art), or optionally to search specifically within integrated corporate resources or even within a plurality of specific resources, such as (for example) if a user has general knowledge of what they want to search for, but needs more specific information—for example, a user might know they want to search for a particular service within a company's portfolio, and might select to search within a known relevant department for particular contact information regarding such a service, such as contact information for a local marketing branch or executive.

A further use of integration with search engine 511 and routing system 521 might be additional integration of a web application 514 that may operate independently or alongside search engine 511 (potentially as an embedded component of search engine 511, such as displayed alongside search results) for such purposes as to add contact functionality to search results. Such functionality might include, for example, the ability for a user to search integrated resources, optionally select a contact endpoint from any results of such a search, and optionally to schedule a contact request to take place at a specified time or within a specified time interval, rather than initiate contact immediately.

A further function of such integration may be additional integration with a call status server 542 for such purpose as to, for example, monitor the status of an interaction request as described above. Such monitoring uses might include verifying that a request was received by an agent, verifying that an agent is appropriately skilled to handle a user's request, or notifying a user of events such as an agent viewing their request, an agent being assigned to their request, a request being transferred (such as to a more appropriate department or to a better-qualified agent such as escalating an interaction to a supervisor for specific types of requests), a scheduled request approaching (optionally configurable from within a mobile app 513 or web app 514 such as via user preferences, or could optionally integrate with existing user preferences from a device operating such an app, such as a smartphone operating a mobile app 513 that might have default notification preferences such as from a calendar or reminder application), or even allowing an agent to respond to a request and presenting information from such a response to a user—such functionality may be useful if a requested interaction schedule is outside of operating business hours, as might occur if a customer is travelling abroad and only available during hours that a contact center may be closed due to time zone difference, and an agent may answer a user's question or provide information relevant to a user's interests (such as based on information that may be contained within a contact request or optionally available via integrated technologies accessible by an agent, for example an agent may utilize an integrated search functionality as described above to search any available integrated information regarding a user, such as to determine interests relevant to products or services an agent's company offers or to determine any recent or potentially-relevant concerns or questions a user may have), which may then be relayed directly to user without requiring them to call back or manually check on the status of a previous request.

An IVR 531 might be utilized when a customer (or any other individual that might seek to contact a corporation through a contact center, which need not be an existing customer) places an inbound call to a corporation's contact number, for identifying such information as a caller's personal information (as may be useful for identifying customer information such as existence of an account or previous interaction history), or reasons for calling (such as may be useful for routing a call to an appropriate destination such as a department or agent with the proper skills, tools, or information to best assist the caller). IVR 531 traditionally is often a single system responsible for handling all incoming calls to a corporation's contact centers, however it should be appreciated that alternate configurations are possible according to the invention, such as (for example) having a particular IVR 531 that may be accessed via one contact number, while at the same time having additional or alternate contact numbers that may connect to additional or alternate IVR systems or contact resources, such as direct lines for specific agents or other personnel, or specific numbers for individual contact centers. Access to an IVR 531 may be desirable for integration according to the invention for such purposes as, for example, a virtual assistant 512 directly accessing a company's IVR 531 to more quickly or accurately input information that might be integrated or available to an assistant (as is common in the art, such as a mobile device making contact information or location data available to a mobile virtual assistant technology such as Siri™), thus bypassing the need for a user to input information manually.

In this manner it should be appreciated that such integration may greatly benefit both corporate and individual users, by making the overall user experience more convenient and efficient, and by increasing customer satisfaction and relevancy or usefulness of routing results to facilitate improved interactions between a corporation and individual users or customers. It should be further appreciated that any arrangements and elements illustrated are purely exemplary in nature, and a wide variety of alternate or additional arrangements and elements are possible and may be utilized according to the invention. It should be further noted that while some elements may be illustrated in a singular instance (such as IVR 531), multiple instances of such elements may be possible and may be utilized according to the invention, and the singular instance is used for brevity and clarity and should not be construed as a limitation of the invention in any way.

Figure 6:
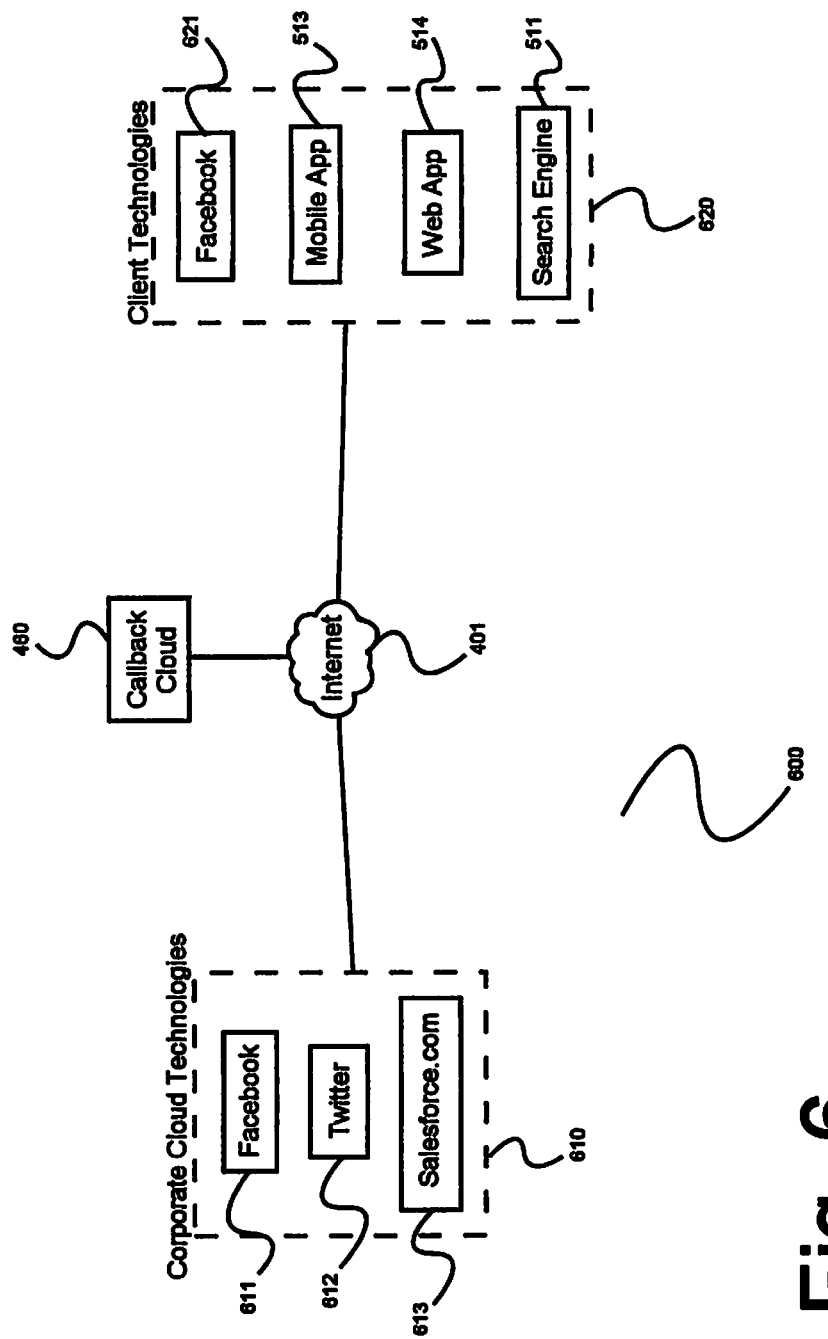
FIG. 6 is a block diagram of an exemplary system architecture, illustrating the use of third-party cloud-based technologies, according to an embodiment of the invention.

FIG. 6 is an illustration of an exemplary system architecture 600, illustrating use of various corporate cloud-based technologies 610, according to an embodiment of the invention. As illustrated, cloud-based technologies 610 may be utilized according to the invention for integration with client technologies 620, which may or may not themselves be cloud-based or otherwise provided by a third-party service provider. Such third-party client services might include, as illustrated, Facebook™ profiles 621 of customers, which may contain a variety of potentially-relevant personal information such as a customer's personal identity information (name, age, gender, physical characteristics, location, or any of a variety of other information that can be commonly found in a personal profile maintained by social networking services such as Facebook™ or similar providers), information regarding interests (such as user postings about activities they enjoy or places they frequent), or recent posts that might contain relevant information cues such as expressions of frustration with a product or service, or posting questions for assistance from other networked users. Additional client technologies that may be desirable to integrate with cloud-based or third-party corporate technologies might include mobile applications 513, web-enabled or embedded applications 514, or search engines 511, functionality of which were described previously (referring to FIG. 5) and new functionality of which (utilizing cloud-based or third-party technology integration) is described in detail below.

Exemplary cloud-based or third-party corporate services may include social networking services such as Facebook™ 611 (which may serve a similar function as described above regarding a client's Facebook™ profile 621 and is described in greater detail below) or Twitter™ 612 which might be used for company personnel to communicate with each other or with customers, or for corporate announcements such as upcoming events or promotions, or third-party services that might be utilized by a corporation internally such as those offered by service providers such as salesforce.com 613, which may be used for various internal functions such as workforce management or customer service, and which may contain or provide access to information that might be relevant to a customer.

As illustrated, a company might utilize employee or company (i.e., representing the corporate entity as a whole) social accounts profiles such as a Facebook™ profile 611 or Twitter™ account to increase exposure—it will be appreciated that social networking is becoming increasingly common in the art and exposure via commonly-used or easily accessible social media channels (such as Facebook™ 611 or Twitter™ 612, as illustrated) may be of great benefit to a corporation as a whole as well as employees in particular, and such profiles might contain information regarding a company's products or services, employee information (which might range from very general information such as approximate number of individuals employed to very specific information such as direct links to employee personal profiles or embedded personal information such as contact numbers for executive personnel), or announcements of upcoming events, services or products, or postings asking for user or customer input (such as Twitter™ posts or "tweets" announcing surveys, promotional events such as raffles or contests, or asking for user feedback on products or services). It should be appreciated that such information presented through social media outlets may be extremely varied in both nature and relevancy (such as due to a company presenting information to an unusually large and diverse audience, i.e. the entire body of current, previous, and potential customers that may participate in social media), that a company might seek to expose a large quantity of information to maximize public exposure, and that integration with client technologies such as (for example) search engine technologies 511 may be of great benefit in terms of market exposure, building product release anticipation, increasing company availability to customers by making information such as contact numbers, addresses publicly available in a popular, convenient format, and increasing customer perception of a company such as by presenting corporate executives in an accessible format—customers might have the ability to communicate directly with high-level management, which may be difficult or even impossible in traditional customer service models, and customers may have the opportunity to see such corporate individuals in a relatable fashion by viewing personal comments, photographs, or interests of such individuals (such as might be possible if, for example, a corporate executive established a social profile and made their photo collection publicly-available, and regularly posted photographs of their non-business-related activities such as hobbies that customers might share or relate to).

Social integration may also be of great benefit to customers or potential customers, as they may now have the option (continuing with the above example of integration with search engine technologies 511) to query information regarding a company or their products or services that may not necessarily be available on a company website or via other traditional channels (such as checking for information on in-development or upcoming products that have yet to be publicly unveiled on a company website), and customer experience may be improved with the potential for "morale boosting" events such as giveaways or surveys that encourage customer participation and may optionally offer incentives such as for simply being a customer (such as traditional product registration programs that may offer small incentives to customers who identify a product purchase with the manufacturer) or for specific or qualifying customers (such as "rewards" programs that offer variable or scalable incentives based on customer purchases or participation in events), giving participants a positive impression and "gameplay" experience with relevant and tangible incentives that encourage customers to display loyalty to a company, product, or service while also giving participating customers the satisfaction of supporting something they enjoy or the excitement of competition for a prize.

Another integration possibility is that of utilizing information available via third-party corporate services such as those provided by salesforce.com 613 or similar service providers, which might contain information ordinarily inaccessible to customers or other individuals outside a corporation, but which may be relevant or desirable to such individuals without compromising corporate confidentiality or security. Exemplary services might include customer service management services that might allow for improved customer service as compared to a traditional contact center model, such as by aggregating and tracking customer information such as profile information or account history, collaboration services such as might be utilized for internal communication or development (such as tracking progress or "milestones" of other employee projects or participating in collaborative meetings via a cloud-based communications platform), or internal workforce management services that might be utilized for management of internal staffing or human resources tasks. Such information might be relevant to individuals pursuing detailed company information for such purposes as investigating potential employment or investment opportunities, or customers who might want to keep up with internal developments regarding products or services they use or might be looking forward to (continuing from the previous example wherein users participated in social media to keep up with upcoming product releases, a user might take it a step further and monitor internal progress on new products even before any information is released via publicly-accessible outlets such as social media or company press releases). Such integration might be accomplished by utilizing (as described previously) search engine technologies 511 to expand the breadth of potential information for queries to include corporate resource information, and optionally integrating such resource information with other search results or embedding in web-enabled software 514. Similarly, web-enabled software 514 or mobile applications 513 might be integrated such as to enable users to view cloud-based resource information from within an application, such as alongside other, more commonly-available information.

An example of such functionality might be a user interacting with a mobile application 513 for skiing enthusiasts, which might be integrated with a ski equipment manufacturer's Facebook™ 611 and salesforce.com 613 profiles to provide the user with additional information gathered from such sources that may be relevant to other information within application 513 (for example, if the user is viewing catalog entries for new ski goggles, an embedded application element might display information regarding a recently-released product from a company that has integrated their internal resources with the application). Another potential use might be embedding employee Twitter™ 612 postings within an element displayed on a company's website for presentation to individuals browsing through the pages, or potentially filtering tweets based on content to display specific posts that are relevant to other content on a page currently being viewed, such as product information or currently-running promotional events.

Figure 7:
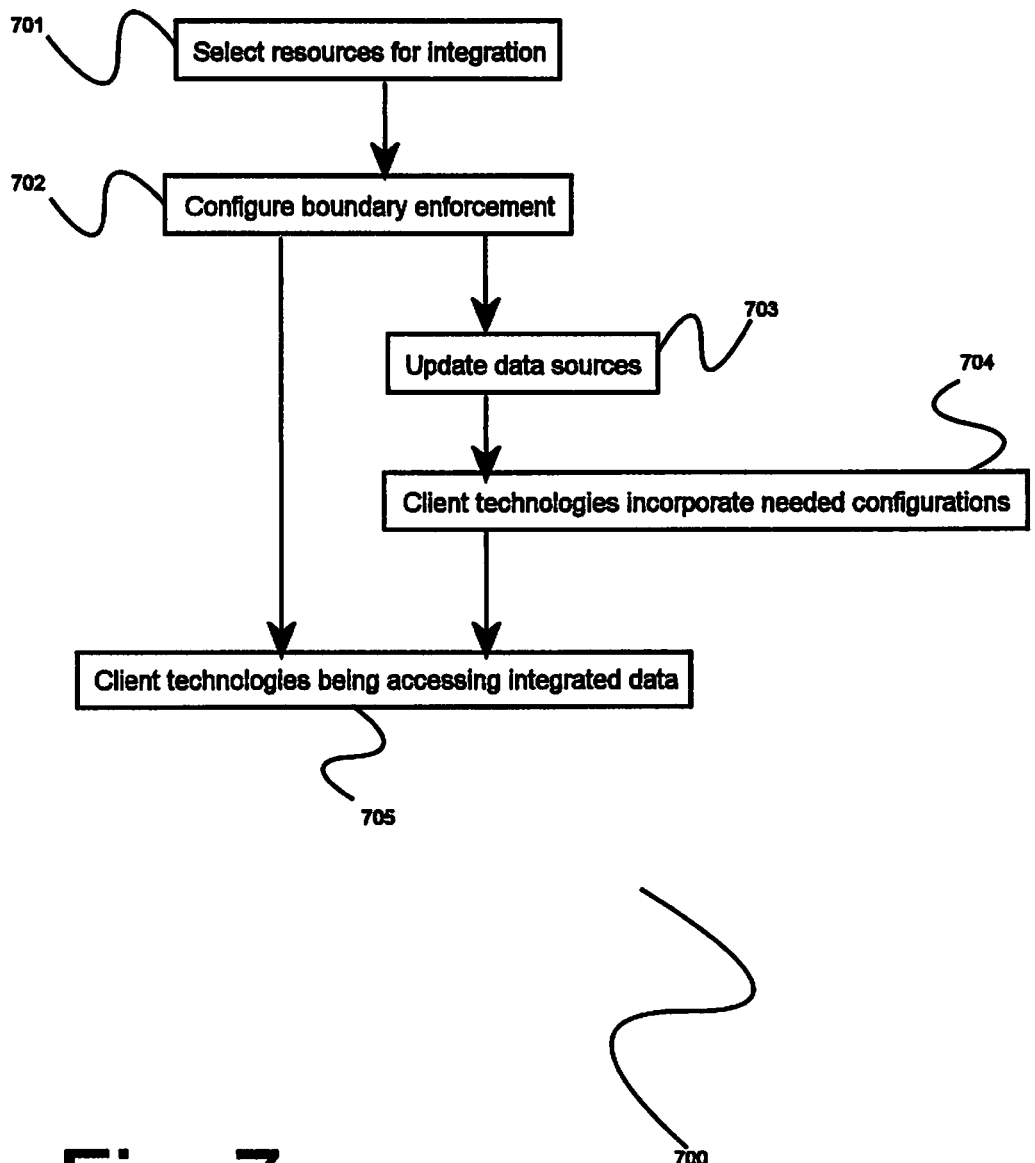
FIG. 7 is a method diagram illustrating an overview of integration of existing client technologies, according to a preferred embodiment of the invention.

FIG. 7 is a method diagram illustrating an exemplary method 700 showing a broad overview of a process for integration of corporate resources with existing client applications, according to a preferred embodiment of the invention. In an initial step 701, a company may select resources for integration with client technologies, such as to expose additional information for customers. In this manner, a company may choose to integrate specific resources while choosing not to integrate others, in effect exposing only selected internal information for use by client technologies, at their discretion. In a next step 702, company personnel (such as IT staff, web administrators, or service technicians) may configure selected resources to expose desired information without compromising company security or confidentiality concerns—i.e., setting up boundary enforcement to ensure only information that is desired to be made available is integrated, while preventing integration of information that it may be desirable not to make available, such as detailed company financial information or customer personal data. In this manner, resources may be safely integrated while simultaneously resolving any concerns from either a company or its customers regarding issues of privacy or security as such issues may be of high concern to involved parties. An example of such configuration would be a company that has chosen to integrate IVR prompts for use with existing virtual assistant technologies. In such a scenario, IVR programming may be modified to be suitable for input from a virtual assistant, such as any necessary formatting of menu prompts or expected response patterns.

In a next step 703, existing data storage such as databases, application information such as data downloaded by mobile applications may optionally be updated to reflect new information resulting from integration. Such updates might simply be references to new information sources to notify client technologies that such information is now available next time a storage medium is accessed, or updates might be "pushed" to their respective storage or applications to ensure availability. It should be appreciated that the nature of such an update may vary based on specific resources or technologies being integrated and client technologies intended to be able to access such information, and that a variety of update methods and data content may be utilized according to the invention. As an example and continuing from the above scenario of integrating a contact center's IVR system with existing virtual assistant technologies, a company might release updated program functionality or database entries corresponding to (for example) new language patterns associated with navigating an IVR system or expanded assistant functionality to enable new functions designed to take advantage of integrated resources (such as search functionality for accessing an integrated product database, or additional program features for accessing information, applications, or services operating on a device alongside a virtual assistant).

A company may optimize any required user installation of such updates by such means as bundling all necessary updates into a single software download that a user may choose to install (such as a company publishing a "virtual assistant package" for customers), which may then incorporate all necessary configurations and functions to operate with newly-integrated resources. In this manner, a user may retain control over whether or not their particular assistant may integrate with specified resources (and thus the user ultimately holds the decision of whether to accept any inconvenience of installation), and should they choose to integrate the process is made as minimal and seamless as possible.

In a next step 704, client technologies may access updated data according to their function and selected resources configured for integration by a company, and may as a result incorporate any necessary configurations to enable access to integrated resources—for example, it is a common practice for software to utilize a list or repository of "pointers" such as network addresses or other locations of sources from which data may be retrieved during updates. Such repositories stored within an application such as a mobile application operating on a smartphone or other mobile computing device might be updated to reflect locations of newly-integrated resource data or service information so that client technologies may access information as desired in the manner appropriate to the resource (exemplary methods for which are described below in greater detail).

Continuing from the previous example of integration with existing virtual assistant technologies, updates may be published to relevant service providers that maintain or operate virtual assistant technologies, such as to update assistant functions (such as to properly access and process personal information stored on a device operating a virtual assistant, or to further integrate an assistant with other client technologies such as a search engine to further expand functional potential when responding to a user's queries) or vocabulary data for new speech patterns that might be encountered when receiving prompts from an IVR.

In this manner, existing virtual assistant technologies may not need to be manually modified by a user or technician, and may simply expand existing functionality the next time a server or database is accessed as part of normal operation. In this manner, existing technologies may take advantage of any integrated resources without alteration, seamlessly integrating with a company's resources and maximizing compatibility while improving user experience.

In a final step 705, client technologies may begin to utilize integrated resources during ordinary function, such as displaying data from integrated sources alongside other data when displaying search results, displaying integrated data in existing web elements such as advertisements or announcements, or other functions according to the nature of a particular technology. In this manner, once a company has selected and configured resources for integration, the process is largely automated and as envisioned by the inventor, a user may experience a seamless integration and may not even be aware that a change has occurred—integration may largely be a "behind the scenes" process, with users simply reaping the benefits of increased information exposure or service functionality. Such an approach is convenient for a user, robust in execution (the only individuals that may need to interact with resources or other system components are IT or other technical personnel who should be qualified for such tasks and therefore less likely to experience issues than untrained personnel), and is inherently adaptable to various client technologies as the specific means of incorporating integrated resources may be adapted to respective client technologies as a function of their operation. It should be appreciated that such an approach is exemplary, and alternate methods or variations may be utilized according to the invention, and further that several variant methods are described below (referring to FIGS. 8-9).

Figure 8:
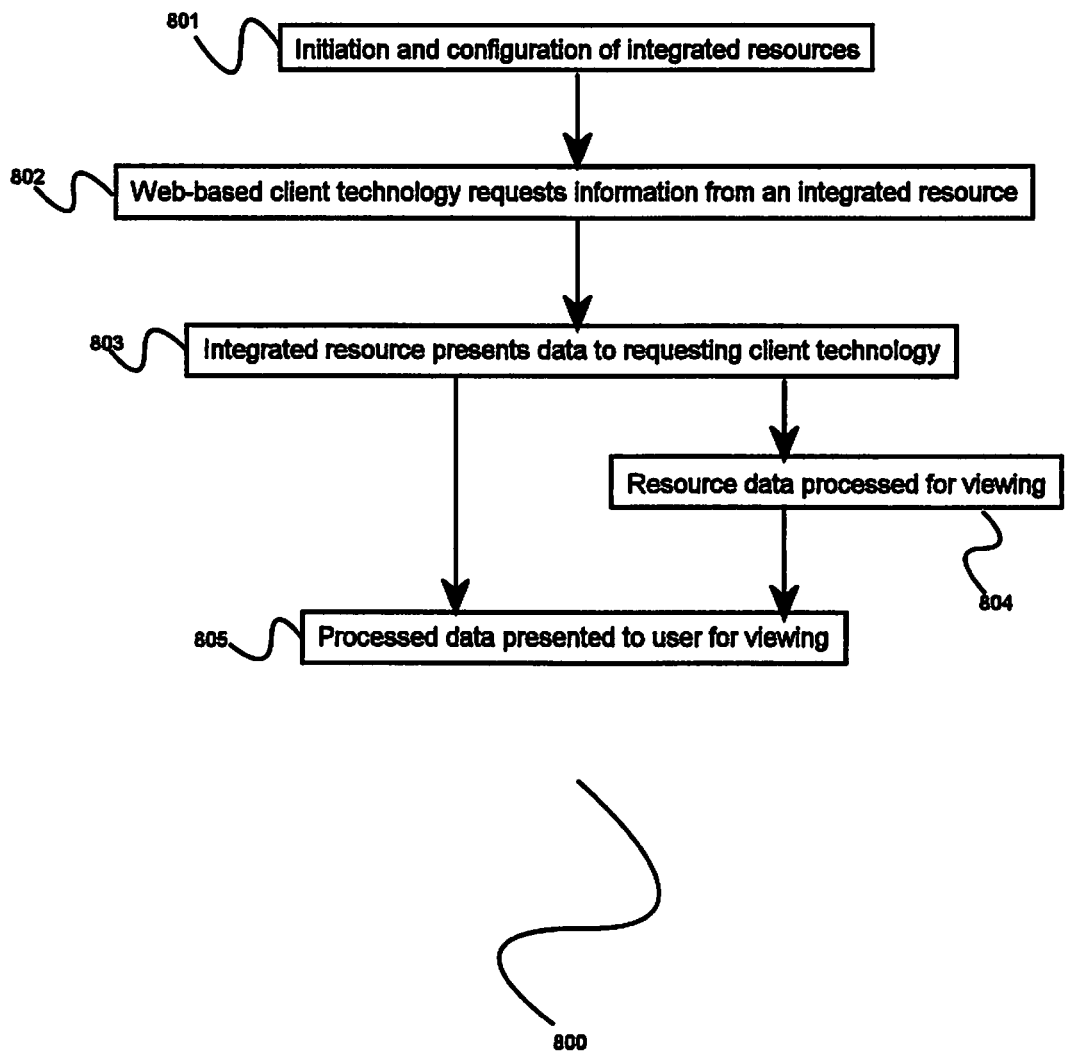
FIG. 8 is a method diagram illustrating integration of existing web-based client technologies, according to an embodiment of the invention.

FIG. 8 is a method diagram illustrating an exemplary method 800 for integration of resources with existing web-based client technologies, according to an embodiment of the invention. As illustrated, in an initial step 801 a company may select and configure resources for integration (such as described previously, referring to FIG. 7). Any configurations necessary with regard to the resources being integrated may be performed at this time, and ideally should not interfere with current resource function. It must be appreciated that the specific procedure or nature of such a configuration is highly variable according to the resources being integrated, and that a variety of procedures and methods may be utilized according to the invention.

In a second step 802, a web-based client technology such as a customer's Facebook™ profile or an embedded web element displayed in a web browser may attempt to access a resource. Such access may occur passively, such as an embedded element of a webpage or web-enabled application that may display recent posts in a Twitter™ feed (and as such, a user may enter the information for a company's integrated Twitter™ account to access integrated data), or may occur actively such as a user entering a company's information into a search engine to query any integrated resources. In either instance, relevant client technologies being utilized (in the example, web-enabled application elements or search engines, respectively) may be existing technologies operating without modification, and any required configuration for compatibility may be performed by a company when configuring resources for integration.

In a next step 803, a resource may present data to a requesting client software or service. Data presented may be of a preconfigured nature such as always displaying the most recent posting from a company's social profile, or it may be specifically requested by a client such as a search engine using user input to query resources such as databases or cloud-based technologies such as salesforce.com data or social media accounts. In this manner, depending on the particular nature of an integrated resource, information may be presented to a variety of client technologies in a meaningful format.

In an optional step 804, the resource data may be processed prior to presentation to a user, such as a search engine ranking received results from a query or a web-enabled element using known user information (such as browser history, personal profile data such as from a logged-in user account, or other potentially-relevant data such as contacts in an e-mail address book or appointments in a calendar application) to determine relevant information to display—for example, an embedded Twitter™ feed element might only display tweets relevant to a user's browsing, search, or purchase history in an attempt to present relevant information. Such processing may not be needed according to a specific client technology or resource being accessed, or according to the nature of a particular request itself. IT should be appreciated that integrated resources may be inherently flexible with regard to such processing, i.e. a resource may present data to a requesting client in either a raw or processed state as may be appropriate.

It should be appreciated that such processing may be a pre-existing function of client technologies (as with integrations with existing client technologies), may be new or expanded functionality as a result of optional software configuration or updates, or may be performed by an integrated resource and then the processed output is sent to the requesting client. In this manner (referring to the third example of processing via an integrated resource), any system load as a result of data processing may be handled by a company's systems (which may be more capable than a client system) to improve user experience by reducing any system slowdown due to increased processing, and existing client technologies may access resource information in a meaningful way without any modification, as all new functions are handled by the integrated resource itself as a component function of integration and data presentation.

In a final step 805, processed data is presented to a user via a client technology such as a web-enabled element of an application or webpage displaying resource data as embedded content or a search engine displaying results of a search. It should be appreciated that the specific nature of data presentation may be flexible and scalable—that is, display of resource content need not be restricted to any particular layout or architecture, and formatting or display of information may be handled by client technologies in a manner similar to any other data to be displayed or may optionally be expanded as a function of either the data itself or processing performed in a previous step 804. For example, a search engine querying integrated resources as part of a search operation might display resource information mixed in with other search results according to traditional search ranking (i.e., the search engine may not recognize resource data or give it priority or any sort of different processing or display), or there may optionally be a dedicated display means for resource data, such as showing "normal" search results in one color and integrated resource results in a second color, or grouping resource data in a second, parallel search results display, or any of a variety of alternate or additional means of meaningfully displaying content for viewing by a user.

Figure 9:
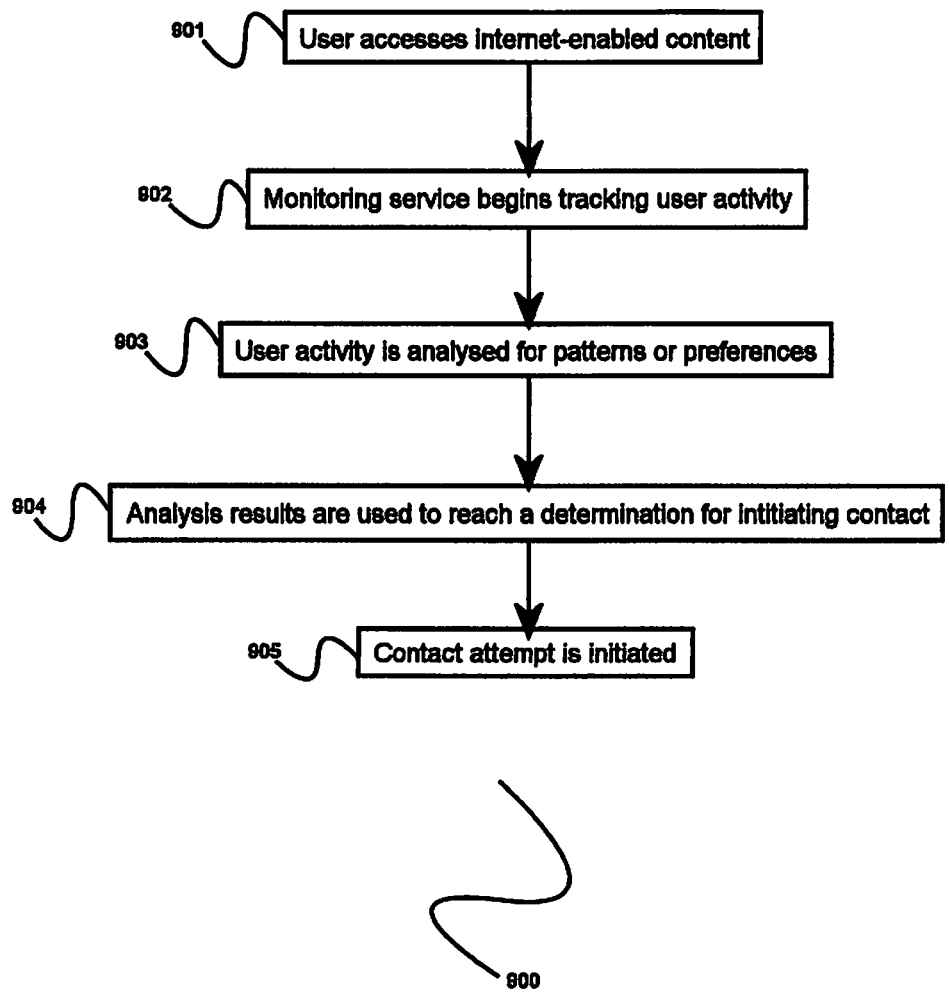
FIG. 9 is a method diagram illustrating the use of intelligent initiation for internet-based client interactions, according to an embodiment of the invention.

FIG. 9 is a method diagram illustrating an exemplary method 900 for intelligently identifying and initiating interactions with an online customer, according to an embodiment of the invention. As illustrated, in an initial step 901 a user accesses online content for a company. Such access may occur via a traditional web browser, or a web-enabled application such as an electronic catalog or mobile application operating on a user's device (such as a smartphone or tablet computing device).

In a second step 902, an integrated company resource such as a web-enabled monitoring service may being monitoring user activity while accessing company resources, such as browsing a company website, viewing company documents over the Internet or other communications network connection, interacting with a company's mobile application, or any of a variety of interaction that may be categorized as pertaining specifically to a company or their products or services. In a next step 903, user activity may be analyzed and processed to determine such information as usage patterns and behaviors, preferences such as products or services being viewed or accessed (such as using an internet-enabled service such as a company-operated software application, or adding an item to an electronic "shopping cart" which might indicate intent to purchase), or communication preferences (such as checking to see whether a user is currently logged into an e-mail account, or is searching for or viewing a particular contact method for company representatives).

In a next step 904, results of user activity analysis may be used to make a determination as to whether to initiate contact with the user (such as identifying a user that is repeatedly viewing a particular product's catalog page but has not made a purchase, which might indicate that they have unanswered questions or concerns about the product) and if so, in what manner should communication take place. Such factors to be considered might include determining when to attempt to contact a user (do their activity patterns indicate they are in a hurry or performing multiple tasks at once? Have they entered any schedule information such as calendar or reminder entries that might be visible to a monitoring service?), how to contact a user (is any contact information known? Have they shown an interest in any particular communication method? Is their browser capable of supporting specific communication methods such as a chat client or voice over internet protocol (VoIP) voice or video call?), or other factors or concerns that may be relevant to initiating an outbound interaction with a current or potential customer.

It should be noted that such analysis relies largely on retrieving or inferring user information and that therefore such processing may benefit from integration of additional services—for example, if a user is an existing customer, it may be possible to use user or browser information to identify a user and locate their customer account within other company resources. It will be further appreciated that such monitoring may raise concerns regarding privacy or identity safety, and it should be noted that the specific nature of any particular resource monitoring or processing user activity may vary, and that it may be designed with specific usage patterns or information types to monitor so as not to raise privacy concerns from (for example) monitoring all activity without regard for relevancy or potential intrusiveness, or a monitoring service may be designed such as to prompt a user or alert them that they may be monitored, and might give them an option to "opt out" of the service to preserve privacy at the expense of potentially decreasing customer service.

In a final step 905, contact may be initiated as appropriate, according to a monitoring service's activities in previous steps. A contact attempt may be of varied form and might include presenting a user with a prompt to chat with a representative via a web-enabled chat client service (either an embedded company resource or a third-party service being accessed by an element of the current page being displayed or application being interacted with), presenting a user with contact information such as a phone number to call for assistance or an e-mail address to send requests to, or may be as simple as embedding text in a displayed web page or application content asking the user if they wish to speak with an agent or offering a plurality of choices for contact methods (as might be appropriate if a determination cannot be made as to a preferred contact method, or if user previously opted out of monitoring in a previous step). In this manner a user may be presented with relevant and helpful assistance but retains the ability to decline assistance easily without interrupting their activities, potentially increasing customer familiarity or knowledge of a company's products or services, presenting a personal, relevant customer service experience, and potentially ensuring that a customer will make a more relevant or more appropriate choice regarding products or services, increasing satisfaction and likelihood of recommendation to other potential customers as well as increasing the potential for return business.

Figure 10:
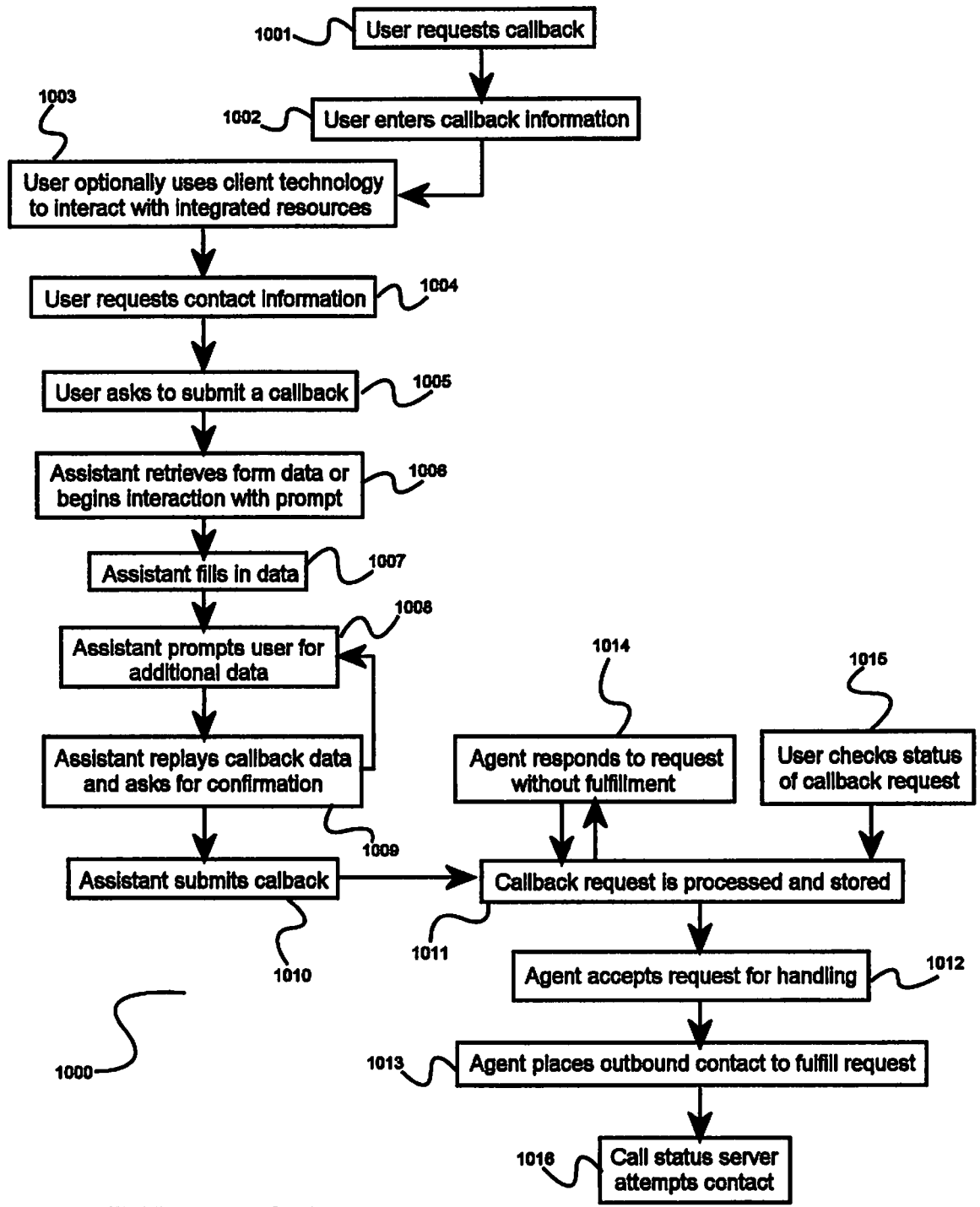
FIG. 10 is a method diagram illustrating an exemplary method for handling outbound interactions or "callbacks", according to an embodiment of the invention.

FIG. 10 is a method diagram illustrating an exemplary method 1000 for handling of outbound contact interactions or "callbacks", as may be requested by a user, according to an embodiment of the invention. As illustrated in a first step 1001, a user may request contact from a company representative such as a contact center agent. Contact may be requested for a variety of reasons, such as questions about a product or service, assistance with a previously purchased product or service, or any of a variety of reasons an individual might seek to contact a representative (as might traditionally be accomplished by calling a customer service phone number). A user might request an outbound contact rather than simply contacting a representative directly for a number of reasons, such as being in a hurry or an inconvenient location for a call or other interaction, or scheduling contact for when they will have a particular product available for assistance while speaking to an agent.

In a second step 1002, a user may enter detailed information regarding a requested contact, such as details about their reason for requesting contact, personal information such as an account number or any other relevant identifying data, product information such as a serial number or product registration information, information regarding the nature of the contact request itself such as preferred contact method, alternate methods or time intervals for contact, or specific instructions (for example, instructing an agent to call a contact phone number and ask for "Jerry"), or any other information that might be relevant to a particular interaction or reasons for requesting contact. It should be appreciated that such information may take some time to enter to a sufficient level of detail to ensure relevant handling of a request. In an optional step 1003, client technologies such as a virtual personal assistant may be utilized to interact with integrated company resources such as an automated voice prompt or electronic form for input of callback information, allowing a user to continue with other activities while their virtual assistant or other technology may handle some or all of the details of the callback. An example of this might be interaction via an existing virtual assistant known in the art such as Siri™, an exemplary method for which is described in detail in the next several substeps.

In a next substep 1004, A user might ask Siri™ or a similar virtual personal assistant technology to locate appropriate contact information for a company (such as a specific phone number for submitting callback requests). In a next substep 1005, a user may then request that the assistant submit a callback request. In a next substep 1006, the assistant may retrieve form data or connect to an interactive menu prompt such as an IVR to fill out the callback request. When an integrated callback system is prepared to accept input, in a next substep 1007 an assistant may proceed to "fill in the blanks" with known information such as a user's name or other personal information, contact information, and any previously-established details regarding the reason for the callback (for example, if the user began the interaction by saying "submit a callback to Company XYZ regarding my broken water pump", an assistant might notate that a callback is regarding a broken water pump). In a next substep 1008, an assistant may prompt the user for any additional details, such as further clarification of the reason for contact or additional instructions regarding the callback scheduling or method. In a next substep 1009, an assistant may replay the callback request and prompt the user for confirmation to either submit the request or return to the form and alter the request (such as adding more details or correcting mistakes). In a final substep 1010, an assistant may submit a callback request to an integrated callback system and complete the interaction with the user.

In a next step 1011, once a callback request is submitted it may be processed (such as routing to an appropriate agent or department or escalating to a supervisor for special handling) or it may be stored for fulfillment (such as in a database or similar data storage). At this point a callback request may be considered to be "pending", and a call status server may notate the request with status information. In a next step 1012, an agent may accept the request, agreeing to contact the user (within a timeframe if specified within a request), and in a final step 1013 an agent may place an outbound contact attempt to the user to attempt to complete the request (which may be of any of a variety of methods such as e-mail, phone call, SMS or other text message, or any other communication method that might have been specified by a user in a callback request or set as a default contact method if none was specified for a particular request). If contact is unsuccessful or impossible (such as requesting contact outside of operating hours), an agent may instead in an optional step 1014 choose to respond to a request, such as annotating the request with information to address a user's concerns, or answering any questions in the request, without necessarily accepting or fulfilling the request. In this manner, even if a request cannot be fulfilled a customer's concerns may still be addressed. The revised request may then be processed and stored for further interaction (such as an agent viewing a request and changing the department for handling it, then the request may be rerouted and stored for further handling by agents in the new department).

In an optional step 1015, a user may connect to an integrated call status server to "check up" on the status of a submitted callback request, and after optionally submitting any needed information such as a confirmation number to retrieve a particular request, a call status server may present a user with the current status of their request. Such status might be a simply confirmation of whether a request was received, is pending, has been accepted or completed, is in progress, or any other concise status message that might be used to give a brief and meaningful notion of the current state of a request. Status information might also contain more detailed data such as any modifications that may have been made to a request after submission, such as if notations were added or questions were answered prior to a contact attempt being made (for example, a plurality of agents may have viewed a request prior to it being handled and completed, any of which might have had input regarding a user's reason for calling). Furthermore, if a request was answered as in step 1014 such as due to being impossible to fulfill or a user being unreachable, a call status server might present a user with any information stored as a part of a request resolution, such as agent-submitted answers to questions from the original request. In this manner, a user may always check on the status of their callback and know how it is being handled. In a further optional substep 1016, a call status server might initiate an outbound contact attempt to a user to notify them of the status of a request. Such a contact attempt might be via an alternate means in the event the requested contact method failed, or may be during an alternate timeframe in the event a requested timeframe was impossible to fulfill. In this manner, every possible avenue of contact may be utilized to maximize issue resolution and customer satisfaction with service.

It should be appreciated that in a manner consistent with previous steps utilizing a virtual assistant to interact with integrated resources, a call status server may be similarly integrated such that a user may utilize a virtual assistant or other client-based technology to facilitate efficient and convenient interaction, such as simply requesting that an assistant "check the status of callback #12345", where "12345" might be a confirmation or identification number for a particular callback request. In this manner, an entire callback process may be integrated for ease of use, as such a process is particularly suited to integration with virtual assistant or other technologies that may enable a user to quickly submit large amounts of information without manual input, such as submitting a request for a callback due to being preoccupied with another task that might also make it difficult or impossible to normally enter callback information manually, whereas the use of an assistant makes it not only possible but convenient to do so without interrupting other activities.

The skilled person will be aware of a range of possible modifications of the various embodiments described above. Accordingly, the present invention is defined by the claims and their equivalents.

What is claimed is:

1. A system for client interaction computer integration, comprising:
   a plurality of enterprise communications systems, each comprising at least a call status system; and
   a callback cloud coupled to the plurality of enterprise communications systems via a data network;
   wherein, upon receipt of a callback request from a client interaction computer via the data network, the callback cloud performs the steps of:

(a) obtaining from at least one of the enterprise communications systems a status of communications resources comprising at least an estimated wait time;
(b) sending a notification to the client interaction computer from which the request was received advising the consumer user associated to the client interaction computer of the estimated wait time for service;
(c) providing at least an option to wait for a callback to the client interaction computer;
(d) receiving a selection from the client interaction computer;
(d1) receiving preconfigured consumer preferences from the client interaction computer;
(d2) determining a suitable time for a callback based on at least the preconfigured consumer preferences; and
(e) directing the at least one of the enterprise communications systems to initiate the callback to the consumer user associated to the client interaction computer in response to the selection received from the client interaction computer; and
further wherein at least one of the enterprise communications systems initiates a callback to a consumer user associated to the client interaction computer at the direction of the callback cloud.

* * * * *